(12) United States Patent
Banerjee et al.

(10) Patent No.: US 8,874,528 B1
(45) Date of Patent: Oct. 28, 2014

(54) SYSTEMS AND METHODS FOR DETECTING CLOUD-BASED DATA LEAKS

(75) Inventors: Deb Banerjee, Cupertino, CA (US); Sanjay Sawhney, Cupertino, CA (US); Sharada Sundaram, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 261 days.

(21) Appl. No.: 13/227,873

(22) Filed: Sep. 8, 2011

(51) Int. Cl.
*G06F 7/00* (2006.01)

(52) U.S. Cl.
USPC .............................. 707/690; 707/694; 705/44

(58) Field of Classification Search
USPC .............................................. 725/24; 705/44
See application file for complete search history.

(56) References Cited

U.S. PATENT DOCUMENTS

| | | | | |
|---|---|---|---|---|
| 2004/0215514 | A1* | 10/2004 | Quinlan et al. | 705/14 |
| 2009/0288150 | A1* | 11/2009 | Toomim et al. | 726/5 |
| 2010/0024034 | A1* | 1/2010 | Cohen | 726/24 |
| 2012/0158454 | A1* | 6/2012 | Saunders et al. | 705/7.28 |

OTHER PUBLICATIONS

Brian Bowen et al.; Baiting Inside Attackers Using Decoy Documents; Department of Computer Science Columbia University, Sep. 2009.

* cited by examiner

*Primary Examiner* — Tony Mahmoudi
*Assistant Examiner* — Tuan-Khanh Phan
(74) *Attorney, Agent, or Firm* — ALG Intellectual Property, LLC (57) ABSTRACT

A computer-implemented method for detecting cloud-based data leaks may include (1) identifying a relational database stored on a third-party storage service, the relational database including a plurality of tuples related by an attribute designated for storing contact information, (2) adding at least one deceptive tuple representing an illegitimate contact and including known false contact information stored under the attribute to the relational database, (3) maintaining a data repository identifying the deceptive tuple as containing false contact information, (4) identifying a contact attempt performed by an attempted use of the known false contact information, and then, in response to identifying the contact attempt, and (5) determining, based on the data repository identifying the deceptive tuple as containing false contact information, that an originator of the contact attempt is implicated in a data leak. Various other methods, systems, and computer-readable media are also disclosed.

16 Claims, 7 Drawing Sheets

| Mary Major | Female | 1927-11-29 | marymajor@example.net |
| Willard Cadigan | Male | 1976-02-20 | wcadigan@example.com |
| Richard Miles | Male | 1984-08-16 | richmiles@example.com |
| Robert Peel | Male | 1969-04-14 | robert.peel@example.org |
| John Stiles | Male | 1939-03-24 | johnstiles39@example.net |
| Jane Roe | Female | 1980-11-08 | jane.q.roe@example.com |
| Fred Bloggs | Male | 1962-06-04 | fredbloggs@example.com |

Deceptive Tuple 220

Contact Attribute 420

False Contact Information 222

SYSTEMS AND METHODS FOR DETECTING CLOUD-BASED DATA LEAKS

BACKGROUND

Due to recent technological advances, individuals and organizations may quickly and easily share, access, and disseminate high volumes of digital information. For many individuals and organizations, the ease with which information may be electronically disseminated is empowering. However, the ubiquity of high-speed Internet access, smart mobile devices, portable storage devices, and third-party storage services may pose unique challenges for individuals and organizations concerned with preventing the loss and/or exposure of sensitive data. Individuals and organizations are therefore increasingly looking to data loss prevention ("DLP") solutions to protect their sensitive data.

Conventional DLP systems typically attempt to protect sensitive data through the use of monitoring and filtering technologies that control the usage, storage, and flow/or of data within a closed system (e.g., a local area network). For example, a conventional DLP system configured to protect data on a network may scan a document before allowing the document to leave the network to ensure that the document does not contain any sensitive data.

Unfortunately, the use of third-party storage services (e.g., cloud storage services) may introduce additional potential leak points for data. At the same time, a data owner who stores data using third-party storage services may have less control over these potential leak points and, accordingly, less ability to use conventional DLP systems to protect data stored on third-party storage services. As such, the instant disclosure identifies a need for improved methods and systems for detecting cloud-based data leaks.

SUMMARY

As will be described in greater detail below, the instant disclosure generally relates to systems and methods for detecting cloud-based data leaks by injecting false contact information into structured data records within cloud-based storage services. In one example, a computer-implemented method for accomplishing such a task may include (1) identifying a relational database stored on a third-party storage service, the relational database including a plurality of tuples related by an attribute designated for storing contact information, (2) adding at least one deceptive tuple representing an illegitimate contact and including known false contact information stored under the attribute to the relational database, (3) maintaining a data repository identifying the deceptive tuple as containing false contact information, (4) identifying a contact attempt performed by an attempted use of the known false contact information, and then, in response to identifying the contact attempt, (5) determining, based on the data repository identifying the deceptive tuple as containing false contact information, that an originator of the contact attempt is implicated in a data leak.

In one example, adding the deceptive tuple to the relational database may include (1) identifying a first subset of data within the relational database with a first access requirement for accessing data within the first subset, (2) identifying a second subset of data within the relational database with a second access requirement for accessing data within the second subset, (3) adding a first deceptive tuple to the first subset, and (4) adding a second deceptive tuple to the second subset based at least in part on the second access requirement being distinct from the first access requirement.

In the above example, adding the second deceptive tuple to the second subset based on the first and second access requirements being distinct may entail (1) identifying a plurality of entities with access to at least a portion of the relational database and (2) determining that a subset of the plurality of entities meets the second access requirement but not the first access requirement. In addition, in the above example the first deceptive tuple and the second deceptive tuple may include different false contact information. In this case, the computer-implemented method may include at least partly identifying the originator by determining that the originator met the second access requirement based on the difference between the first deceptive tuple and the second deceptive tuple and based on adding the first deceptive tuple to the first subset and the second deceptive tuple to the second subset.

In one embodiment, maintaining the data repository identifying the deceptive tuple may include maintaining an age of the deceptive tuple. In this embodiment, the method may also include (1) removing the deceptive tuple based on the age of the deceptive tuple exceeding a predetermined threshold and (2) adding a new deceptive tuple to the relational database to replace the deceptive tuple.

In one example, identifying the contact attempt may include receiving a report from a honeypot system configured to receive contact attempts directed to the known false contact information.

In some examples, determining that the originator of the contact attempt is implicated in the data leak may include determining that the originator is not on a whitelist that specifies who is authorized to contact all contacts stored within the relational database. Additionally or alternatively, determining that the originator of the contact attempt is implicated in the data leak may include determining that the originator of the contact attempt is a former employee of an owner of the relational database. In some examples, determining that the originator of the contact attempt is implicated in the data leak may include determining that the originator is not an employee of an owner of the relational database and is not an authorized business partner of the owner.

In one example, determining that the originator of the contact attempt is implicated in the data leak may include (1) identifying a data access log including access records for data within the relational database, (2) identifying a record of access of the known false contact information within the data access log, and (3) determining, based on analyzing the data access log, that the record of access of the known false contact information represents at least a portion of the data leak.

In one embodiment, a system for implementing the above-described method may include an identification module programmed to identify a relational database stored on a third-party storage service. The relational database may include a plurality of tuples related by an attribute designated for storing contact information. The system may also include an injection module programmed to (1) add at least one deceptive tuple representing an illegitimate contact and including known false contact information stored under the attribute to the relational database and (2) maintain a data repository identifying the deceptive tuple as containing false contact information.

The system may also include a detection module programmed to identify a contact attempt performed by an attempted use of the known false contact information. The system may further include a determination module programmed to, in response to the contact attempt, determine, based on the data repository identifying the deceptive tuple as containing false contact information, that an originator of the contact attempt is implicated in the data leak. In addition, the system may include at least one processor configured to execute the identification module, the injection module, the detection module, and the determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a relational database stored on a third-party storage service, the relational database including a plurality of tuples related by an attribute designated for storing contact information, (2) add at least one deceptive tuple representing an illegitimate contact and including known false contact information stored under the attribute to the relational database, (3) maintain a data repository identifying the deceptive tuple as containing false contact information, (4) identify a contact attempt performed by an attempted use of the known false contact information, and then, in response to identifying the contact attempt, (5) determine, based on the data repository identifying the deceptive tuple as containing false contact information, that an originator of the contact attempt is implicated in a data leak.

As will be explained in greater detail below, by injecting false contact information into structured data records on third-party storage services, the systems and methods described herein may allow a data owner to discover data leaks originating at the third-party storage service by identifying communications using the false contact information. Furthermore, in some examples, these systems and methods may assist in identifying one or more parties involved in a data leak, including storage service administrators, employees, former employees, and/or other intruders.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
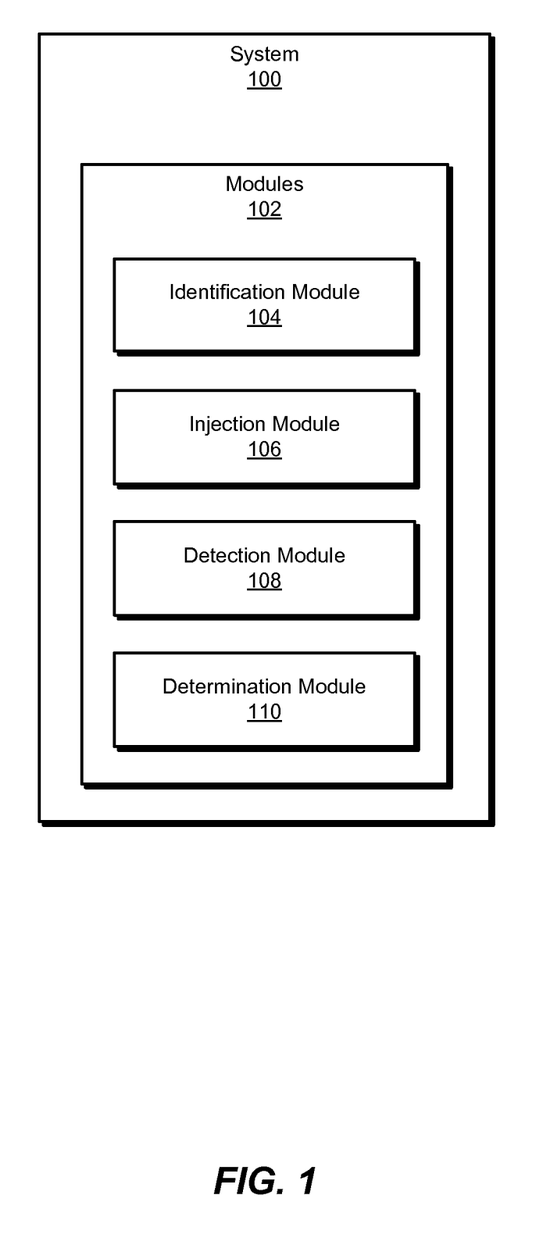
FIG. 1 is a block diagram of an exemplary system for detecting cloud-based data leaks.
Figure 2:
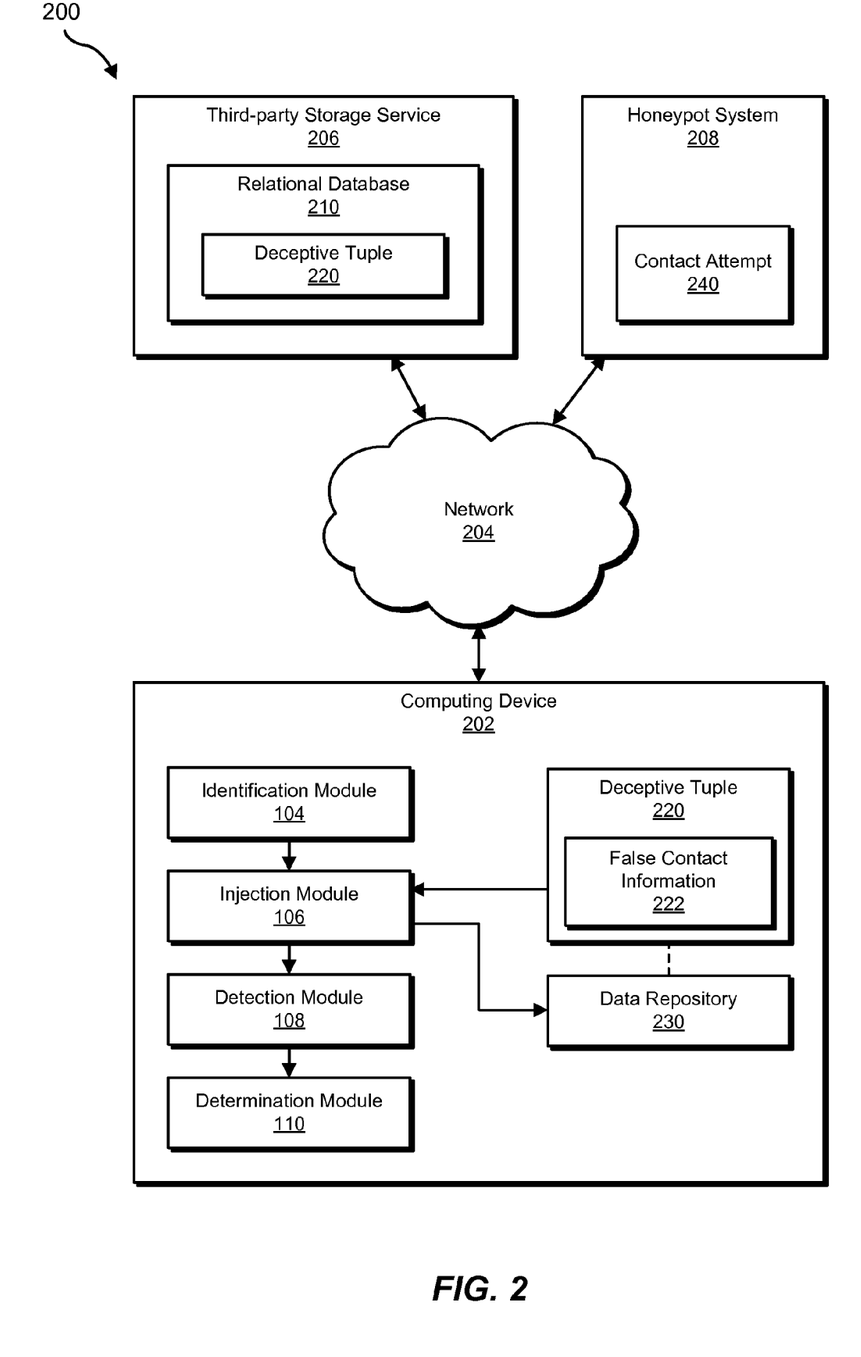
FIG. 2 is a block diagram of an exemplary system for detecting cloud-based data leaks.

The following will provide, with reference to FIGS. 1-2, detailed descriptions of exemplary systems for detecting cloud-based data leaks. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting cloud-based data leaks. As illustrated in this figure, exemplary system 100 may include one or more modules 102 for performing one or more tasks. For example, and as will be explained in greater detail below, exemplary system 100 may include an identification module 104 programmed to identify a relational database stored on a third-party storage service that includes a plurality of tuples related by an attribute designated for storing contact information. Exemplary system 100 may also include an injection module 106 programmed to (1) add at least one deceptive tuple representing an illegitimate contact and including known false contact information stored under the attribute to the relational database and (2) maintain a data repository identifying the deceptive tuple as containing false information.

In addition, and as will be described in greater detail below, exemplary system 100 may include a detection module 108 programmed to identify a contact attempt performed by an attempted use of the known false contact information. Exemplary system 100 may also include a determination module 110 programmed to determine, in response to identifying the contact attempt, that an originator of the contact attempt is implicated in a data leak based on the data repository identifying the deceptive tuple as containing false contact information. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, third-party storage service 206, and/or honeypot system 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a third-party storage service 206 and/or a honeypot system 208 via a network 204.

In one embodiment, one or more of modules 102 from FIG. 1 may, when executed by at least one processor of computing device 202, facilitate computing device 202 in detecting cloud-based data leaks. For example, and as will be described in greater detail below, one or more of modules 102 may cause computing device 202 to (1) identify relational database 210 stored on third-party storage service 206, (2) add a deceptive tuple 220 representing an illegitimate contact and including false contact information 222 to relational database 210, (3) maintain a data repository 230 identifying deceptive tuple 220 as containing false contact information, (4) identify a contact attempt 240 performed by an attempted use of false contact information 222, and then, in response to identifying contact attempt 240, (5) determine, based on data repository 230 identifying deceptive tuple 220 as containing false contact information, that an originator of contact attempt 240 is implicated in a data leak (e.g., from relational database 210).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Third-party storage service 206 generally represents any type or form of computing system that is capable of providing online storage hosting. Examples of third-party storage service 206 include, without limitation, cloud storage services and/or virtualized storage pools. In some examples, third-party storage service 206 may provide a client with a view of data stored on behalf of the client without providing to the client complete access to all underlying systems.

As illustrated in FIG. 2, third-party storage service 206 may include one or more databases, such as relational database 210. In one example, relational database 210 may be configured to store data owned by the owner of computing device 202. For example, relational database 210 may be configured to store corporate data, such as contact information of customers, employees, business partners, volunteers, and/or clients of an enterprise.

Relational database 210 may represent portions of a single database or computing device or a plurality of databases or computing devices. For example, relational database 210 may represent a portion of third-party storage service 206 in FIG. 2, computing system 610 in FIG. 6, and/or portions of exemplary network architecture 700 in FIG. 7. Alternatively, relational database 210 in FIG. 1 may represent one or more physically separate devices capable of being accessed by a computing device, such as third-party storage service 206 in FIG. 2, computing system 610 in FIG. 6, and/or portions of exemplary network architecture 700 in FIG. 7.

Honeypot system 208 generally represents any computing system capable of gathering and/or reporting information relating to communications directed to particular targets (e.g., e-mail addresses, phone numbers, etc.). Examples of honeypot system 208 may include computing systems configured to receive emails sent to certain email addresses, caller identification systems, voicemail systems, etc.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and third-party storage service 206.

Figure 3:
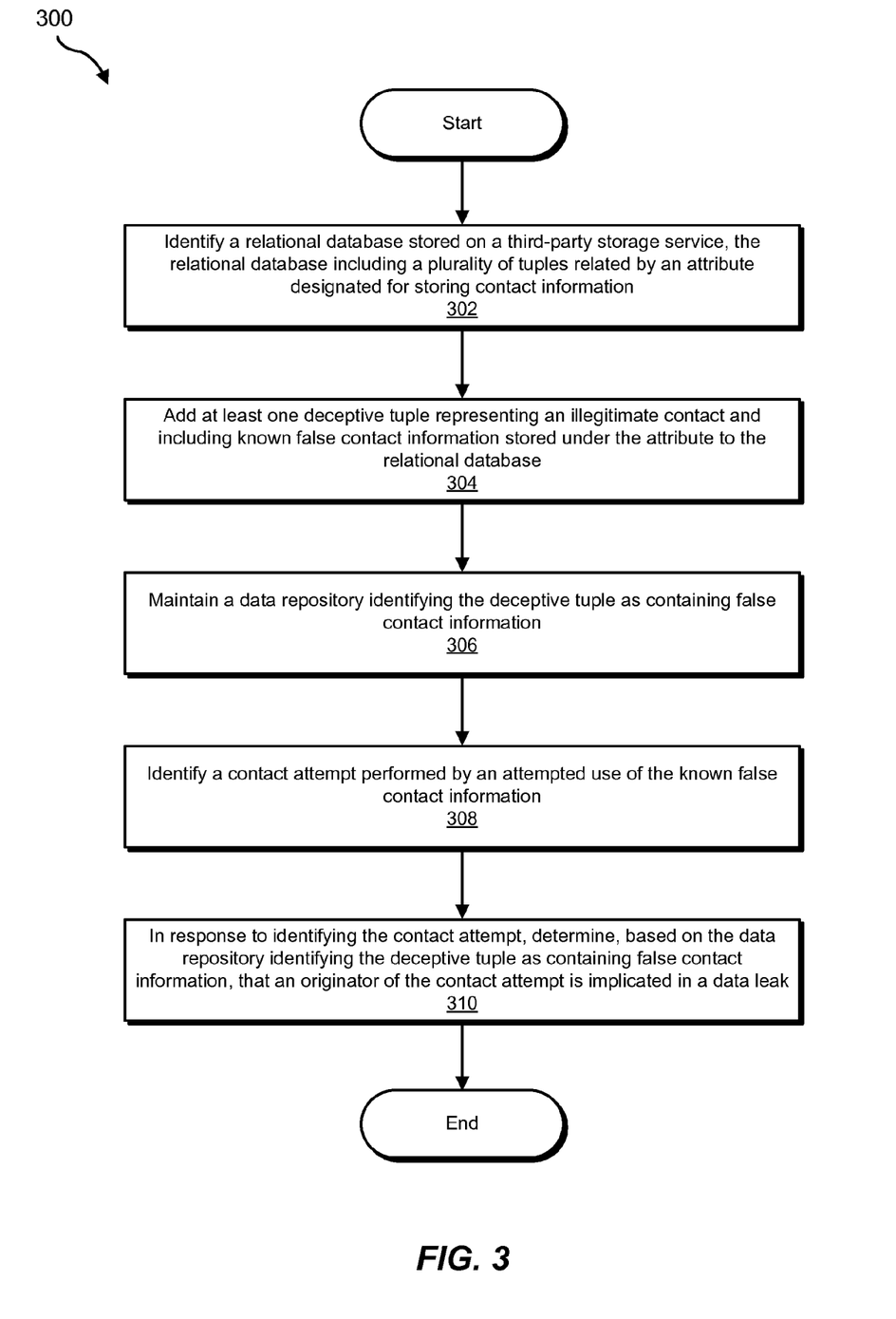
FIG. 3 is a flow diagram of an exemplary method for detecting cloud-based data leaks.

FIG. 3 is a flow diagram of an exemplary computer-implemented method 300 for detecting cloud-based data leaks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a relational database stored on a third-party storage service that includes a plurality of tuples related by an attribute designated for storing contact information. For example, at step 302 identification module 104 may, as part of computing device 202 in FIG. 2, identify relational database 210.

As used herein, the phrase "relational database" may generally refer to any structured set of data. In some examples, the phrase relational database may refer to a collection of data structured as a relation and/or table. Such a relational database may be implemented in any suitable format. For example, the relational database may be implemented within a database management system, a spreadsheet, a delimited set of data fields representing a table, and/or any other format capable of structuring a relational database and/or a data set capable of representing a relational database.

Figure 4:
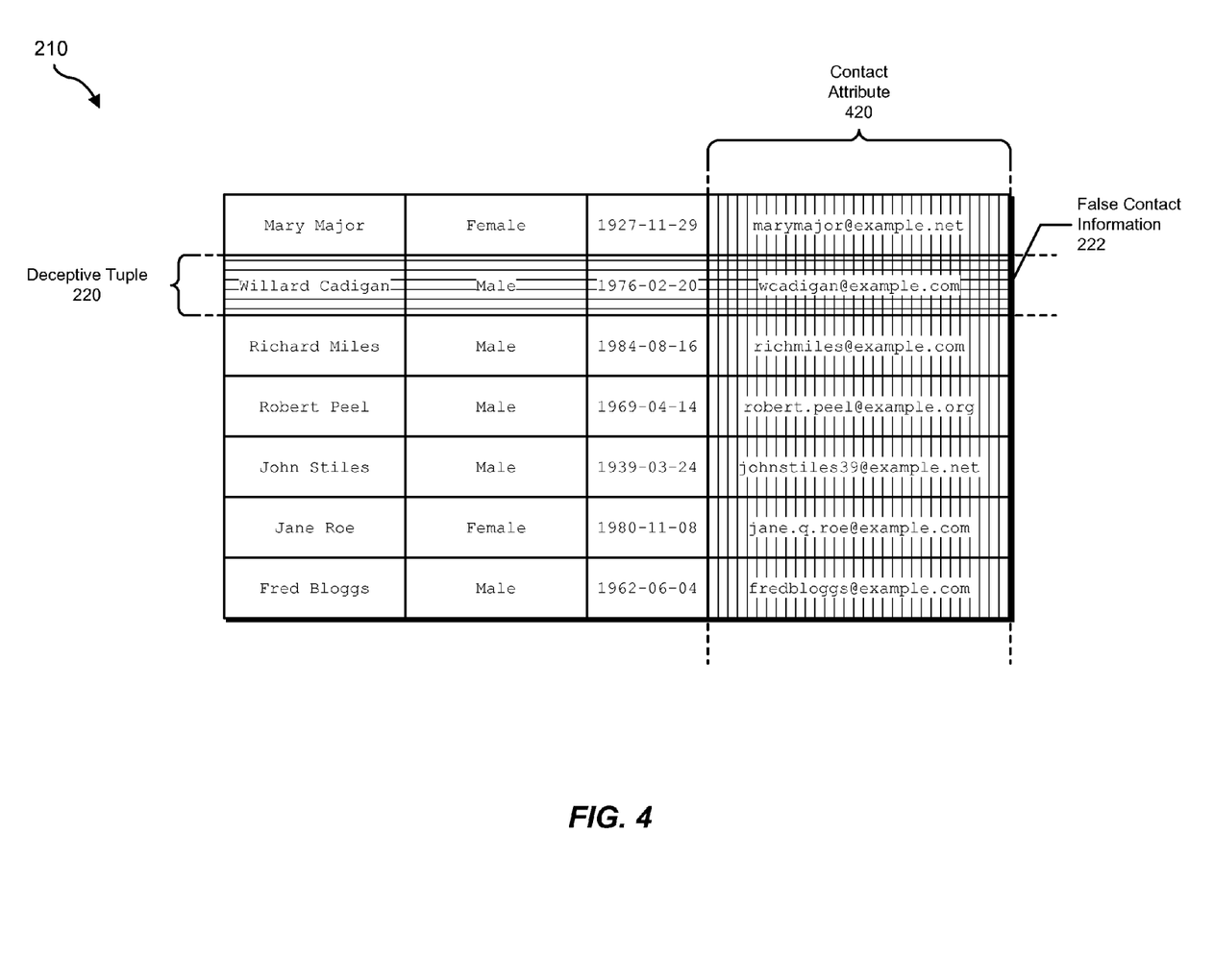
FIG. 4 is an illustration of an exemplary relational database used for detecting cloud-based data leaks.

FIG. 4 contains an illustration of an exemplary relational database 210. As shown in FIG. 4, relational database 210 may include seven rows (representing seven tuples) and four columns (representing four attributes). As used herein, the term "tuple" may refer to any record, row, and or collection of data fields for storing data. Likewise, the term "attribute" may refer to any column and/or type applicable to multiple tuples within a relation. Accordingly, contact attribute 420 in FIG. 4 may represent an attribute designated for storing contact information (e.g., email addresses) for each tuple in relational database 210.

As used herein, the phrase "contact information" may refer to any address, code, identifier, and/or handle that can be used to direct a communication to a corresponding entity. Examples of contact information include, without limitation, email addresses, telephone numbers, Voice over Internet Protocol (VOIP) contact identifiers, fax numbers, instant messenger handles, and social networking account identifiers. In some examples, the phrase "contact information" may also refer to password, countersigns, and/or verification codes required to establish communication with a corresponding contact.

Identification module 104 may identify the relational database in any suitable manner. For example, identification module 104 may read a configuration setting identifying the relational database. Additionally or alternatively, identification module 104 may identify a connection with a third-party storage service and determine that the relational database is stored on the third-party storage service. For example, identification module 104 may determine that the third-party storage service is outside the control of a data loss prevention system, and, in response, perform one or more of the methods described herein to detect any data leaks from the third-party storage service.

Returning to FIG. 3, at step 304 one or more of the systems described herein may add at least one deceptive tuple representing an illegitimate contact and including known false contact information stored under the attribute to the relational database. For example, at step 304 injection module 106 may, as part of computing device 202 in FIG. 2, add deceptive tuple 220 representing an illegitimate contact and including false contact information 222 to relational database 210.

As used herein, the phrase "illegitimate contact" may refer to any contact that is deceptive, that is fabricated, that contains incorrect information, and/or that is stored in the relational database for a purpose other than the primary purpose of ordinary operational use. Likewise, the phrase "known false contact information" may refer to any contact information that is deceptive, that is fabricated, that does not correspond with other information within the deceptive tuple (e.g., contact information that does not match with a name stored in the deceptive tuple). Additionally or alternatively, "known false contact information" may refer to any contact information used as a honeytoken and/or used within a honeypot system to detect attempts to use the contact information.

Using FIG. 4 as an example, injection module 106 may add deceptive tuple 220 to relational database 210. As illustrated in FIG. 4, contact attribute 420 of deceptive tuple 220 may include false contact information 222 (i.e., "wcadigan@example.com"). In this example, the email address "wcadigan@example.com" may represent an email address registered for the purpose of identifying a data leak of relational database 210. For example, deceptive tuple 220 in relational database 210 may represent the only known stored instance of the email address "wcadigan@example.com." Accordingly, any use of "wcadigan@example.com" may imply a prior access to deceptive tuple 220. Furthermore, since injection module 106 may create deceptive tuple 220 exclusively for use in detecting data leaks (i.e., deceptive tuple 220 represents data that would otherwise go unaccessed by an owner of relational database 210 in the ordinary course of business), any access of deceptive tuple 220 may imply an illegitimate use of relational database 210 and/or a data leak from relational database 210.

Returning to step 304, injection module 106 may add the deceptive tuple in any of a variety of contexts. In some examples, injection module 106 may add the deceptive tuple in such a way as to maximize the ability to detect and/or track data leaks. In one example, injection module 106 may add the deceptive tuple by (1) identifying a first subset of data within the relational database with a first access requirement for accessing data within the first subset, (2) identifying a second subset of data within the relational database with a second access requirement for accessing data within the second subset, the second subset of data being distinct from the first subset of data and the second access requirement being distinct from the first access requirement, (3) adding a first deceptive tuple to the first subset, and (4) adding a second deceptive tuple to the second subset based at least in part on the second access requirement being distinct from the first access requirement. As used herein, the term "access requirement" may refer to any requirement for accessing data from the relational database. Examples of access requirements include, but are not limited to, user account privileges, absences of user account restrictions, passwords, decryption keys and client-side security access requirements (e.g., required hardware and/or software configurations on a client system for accessing data in the relational database from the client system, geolocation-enforced requirements that limit data access based on a current location of the client system, etc.).

Figure 5:
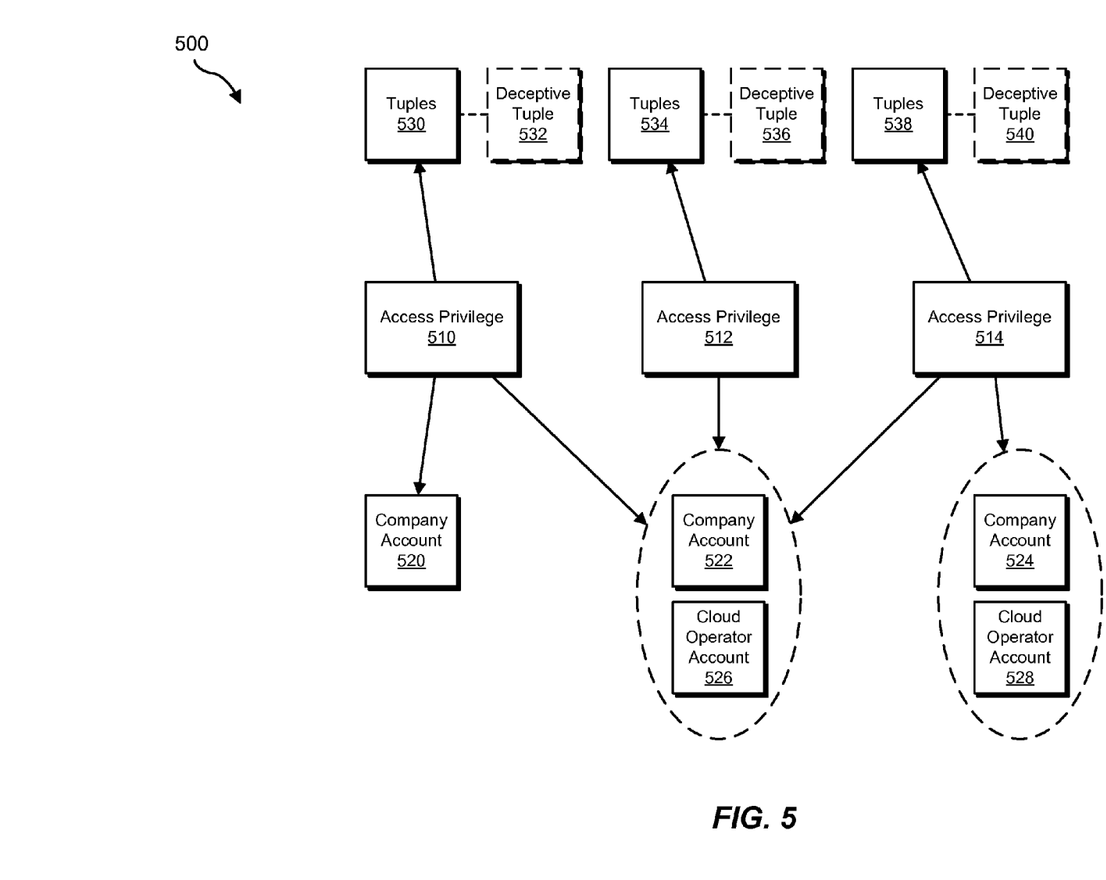
FIG. 5 is a diagram of an exemplary configuration for detecting cloud-based data leaks.

FIG. 5 is an illustration of an exemplary configuration 500 for detecting cloud-based data leaks. As shown in FIG. 5, different tuples may be accessible (e.g., for reading) according to different access privileges. For example, an access privilege 510 may grant access to tuples 530, an access privilege 512 may grant access to tuples 534, and an access privilege 514 may grant access to tuples 538. Using FIG. 5 as an example to illustrate step 304, injection module 106 may determine how to add deceptive tuples to a relational database based on access requirements pertaining to distinct subsets of the relational database. For example, injection module 106 may identify a first subset of data within the relational database (e.g., tuples 530) with a first access requirement for accessing data within the first subset (e.g., access privilege 510). Injection module 106 may also identify a second subset of data within the relational database (e.g., tuples 534) with a second access requirement for accessing data within the second subset (e.g., access privilege 512). Injection module 106 may add a deceptive tuple 532 to tuples 530. Injection module 106 may then add a deceptive tuple 536 to tuples 534, based on access privilege 512 for tuples 534 differing from access privilege 510 for tuples 530. Likewise, injection module 106 may add a deceptive tuple 540 to tuples 538 because access privilege 514 differs from access privilege 512 and access privilege 510.

Accordingly, injection module 106 may increase coverage of deceptive tuples across data subsets with differing access requirements (e.g., so that each access privilege provides access to at least one deceptive tuple). By increasing the diversity of access to deceptive tuples, injection module 106 may improve the probability that a data leak performed according to any access requirement will be detected. Furthermore, as will be discussed in greater detail below, injection module 106 may also use information about access requirements to help to determine who is behind a data leak.

In some examples, injection module 106 may also track which entities meet which access requirements to ensure that each entity has access to at least one deceptive tuple. For example, injection module 106 may (1) identify a plurality of entities with access to at least a portion of the relational database and then (2) determine that a subset of the plurality of entities meets the second access requirement but not the first access requirement. Returning to the example in FIG. 5, injection module 106 may identify a company account 520, a company account 522, a company account 524, a cloud operator account 526, and a cloud operator account 528. Company account 520 may have access privilege 510, granting access to tuples 530. Company account 522 and cloud operator account may have access privileges 510, 512, and 514, granting access to tuples 530, 534, and 538. Company account 524 and cloud operator account 528 may have access privilege 514, granting access only to tuples 538. In one example, injection module 106 may add deceptive tuple 540 to tuples 538 based at least in part on company account 524 and/or cloud operator account 528 having access privilege 514 (but not, e.g., access privilege 510), thereby ensuring that company account 524 and/or cloud operator account 528 can access at least one deceptive tuple. In some examples, injection module 106 may add only deceptive tuples 532 and 540, and not deceptive tuple 536, because deceptive tuples 532 and 540 allow each of company accounts 520, 522, and 524 and cloud operator accounts 526 and 528 to see at least one deceptive tuple. As will be explained in greater detail below, in some examples injection module 106 may also add deceptive tuple 536 in order to determine if a user account with access privilege 512 caused the data leak.

Returning to FIG. 3, at step 306 one or more of the systems described herein may maintain a data repository identifying the deceptive tuple as containing false contact information.

For example, at step 306 injection module 106 may, as part of computing device 202 in FIG. 2, maintain data repository 230 identifying deceptive tuple 220 as containing false contact information (e.g., false contact information 222).

Injection module 106 may maintain the data repository in any suitable manner. For example, injection module 106 may record an identifier of deceptive tuples and/or the known false contact information within the deceptive tuples when injection module 106 adds the deceptive tuples to the relational database. In some examples, injection module 106 may maintain a local database to identify deceptive tuples stored in the relational database. Additionally or alternatively, injection module 106 may maintain the data repository as a part of the relational database. For example, injection module 106 may store separate, secured tuples within the relational database identifying the deceptive tuples. Additionally or alternatively, injection module 106 may store information within one or more fields of deceptive tuples to identify the deceptive tuples as such. For example, injection module 106 may generate the deceptive tuple such that data stored within one or more fields of the deceptive tuple will, when subjected to a fingerprint function, identify the deceptive tuple as deceptive.

In some examples, injection module 106 may also maintain an age of the deceptive tuple. In these examples, injection module 106 may remove the deceptive tuple based on the age of the deceptive tuple exceeding a predetermined threshold. For example, injection module 106 may remove the deceptive tuple when the deceptive tuple has been in the relational database for one year. In another example, injection module 106 may remove the deceptive tuple when the deceptive tuple has reached the average lifespan of legitimate tuples within the relational database. As an additional example, injection module 106 may assign a randomly generated lifespan for the deceptive tuple. Accordingly, deceptive tuples may be more difficult to identify solely based on patterns of their removal. In some examples, injection module 106 may add a new deceptive tuple to the relational database to replace the deceptive tuple based on the removal of the deceptive tuple. For example, injection module 106 may add the new deceptive tuple when the deceptive tuple is removed. In another example, injection module 106 may schedule the addition of the new deceptive tuple for a time when legitimate tuples are likely to be added. Additionally or alternatively, injection module 106 may maintain a target proportion of deceptive tuples (e.g., 2% of tuples in the relational database to be deceptive tuples) and add the deceptive tuple to meet the target proportion. As mentioned earlier, in some examples injection module 106 may add the deceptive tuple to a subset of the relational database based on access requirements for the subset in order to increase diversity of visibility of deceptive tuples within the relational database. In these examples, injection module 106 may add the new deceptive tuple to the same subset of the relational database to replace the deceptive tuple.

Returning to FIG. 3, at step 308 one or more of the systems described herein may identify a contact attempt performed by an attempted use of the known false contact information. For example, at step 308 detection module 108 may, as part of computing device 202 in FIG. 2, detect contact attempt 240 performed by an attempted use of false contact information 222.

Detection module 108 may identify the contact attempt in any suitable manner. For example, detection module 108 may receive a report from a honeypot system configured to receive contact attempts directed to the known false contact information. For example, an email client configured to receive messages addressed to an email address used as known false contact information within the deceptive tuple may send a message to detection module 108 identifying any email received via the email address. Additionally or alternatively, detection module 108 may operate as a part of the honeypot system (e.g., as a part of the email client and/or a service configured to monitor messages received by the email client). As another example, a system configured to receive call attempts via a telephone number used as known false contact information within the deceptive tuple may send a message to detection module 108 identifying any phone call received at the telephone number.

Returning to FIG. 3, at step 310 one or more of the systems described herein may, in response to identifying the contact attempt, determine, based on the data repository identifying the deceptive tuple as containing false contact information, that an originator of the contact attempt is implicated in a data leak. For example, at step 310 determination module 110 may, as part of computing device 202 in FIG. 2, in response to identifying contact attempt 240, determine, based on data repository 230 identifying deceptive tuple 220 as containing false contact information (e.g., false contact information 222), that the originator of contact attempt 240 is implicated in a data leak of relational database 210 (i.e., including deceptive tuple 220). Upon completion of step 310, exemplary method 300 in FIG. 3 may terminate.

Determination module 110 may perform step 310 in any of a variety of ways. For example, determination module 110 may simply determine that a data leak has occurred (e.g., because the known false contact information would not have been used otherwise). Additionally or alternatively, determination module 110 may identify the originator of the contact attempt and determine that the originator is implicated in the data leak by illegitimately acquiring data from the relational database and/or by receiving the illegitimately acquired data from another party.

In some examples, determination module 110 may further implicate the originator of the contact attempt by determining that the originator of the contact attempt is a former employee of an owner of the relational database. For example, determination module 110 may consult a database of former employees to identify an email address that originated the contact attempt. In some examples, determination module 110 may further determine that the contact attempt is evidence of a data leak by determining that the originator is not an employee of an owner of the relational database and is not an authorized business partner of the owner. In this example, determination module 110 may ensure that use of the known false contact information was not for a legitimate purpose. For example, an owner or authorized business partner may be authorized to contact all contacts in the relational database (e.g., by sending a mass email). In this example, determination module 110 may consult a whitelist to verify that the originator of the contact attempt is not on the whitelist.

As mentioned earlier, in some examples injection module 106 may add a first deceptive tuple and a second deceptive tuple to a first and second subset of the relational database, respectively, and the first and second subset of the relational database may have a first access requirement and a second access requirement, respectively. In some examples, the first and second deceptive tuples may include different false contact information. In these examples, determination module 110 may at least partly identify the originator of the contact attempt by determining that the originator met the second access requirement and based on the difference between the first deceptive tuple and the second deceptive tuple and based on adding the first deceptive tuple to the first subset and the second deceptive tuple to the second subset. Accordingly, by recognizing that the false contact information of the second deceptive tuple was accessible via the second access requirement but not the first access requirement, determination module 110 may attribute the origination of the data leak to an entity that met the second access requirement rather than an entity that merely met the first access requirement.

Using FIG. 5 as an example, deceptive tuples 532, 536, and 540 may contain differing false contact information. Accordingly, if false contact information stored in deceptive tuple 536 is used for a contact attempt, determination module 110 may determine that the contact attempt implicates either company account 522 or cloud operator account 526 in a data leak. Additionally, if, at around the same time, detection module 108 detected a separate contact attempt using false contact information stored in deceptive tuple 532, determination module 110 may conclude that company account 522 or cloud operator account 526 are more likely responsible than company account 520 because only company account 522 and cloud operator account 526 could access both deceptive tuple 532 and deceptive tuple 536.

Determination module 110 may also use additional information to determine whether a data leak has likely occurred and/or who is likely responsible for the data leak. For example, determination module 110 may (1) identify a data access log including access records for data within the relational database, (2) identify a record of access of the known false contact information within the data access log, and (3) determine, based on analyzing the data access log, that the record of access of the known false contact information represents at least a portion of the data leak. Determination module 110 may analyze the data access log in any of a variety of ways to determine whether the record of access represents the data leak. For example, determination module 110 may check the time and/or date of the record of access and determine that the known false contact information was accessed outside of normal business hours. Additionally or alternatively, determination module 110 may check a location from which the known false contact information was accessed (e.g., by checking an IP address) and determine that the known false contact information was accessed outside designated business grounds. In another example, determination module 110 may check other records of access (e.g., access attempts made that were near in time to the access of the known false contact information) and determine that a large amount of data was harvested from the relational database within a short period of time. In some examples, determination module 110 may also account for a role, profile, and/or title of a user that accessed the known false contact information to determine that the user is implicated in a data leak of data stored in the relational database.

As detailed above, by injecting false contact information into structured data records on third-party storage services, the systems and methods described herein may allow a data owner to discover data leaks originating at the third-party storage service by identifying communications using the false contact information. Furthermore, in some examples, these systems and methods may assist in identifying one or more parties involved in a data leak, including storage service administrators, employees, former employees, and/or other intruders.

Figure 6:
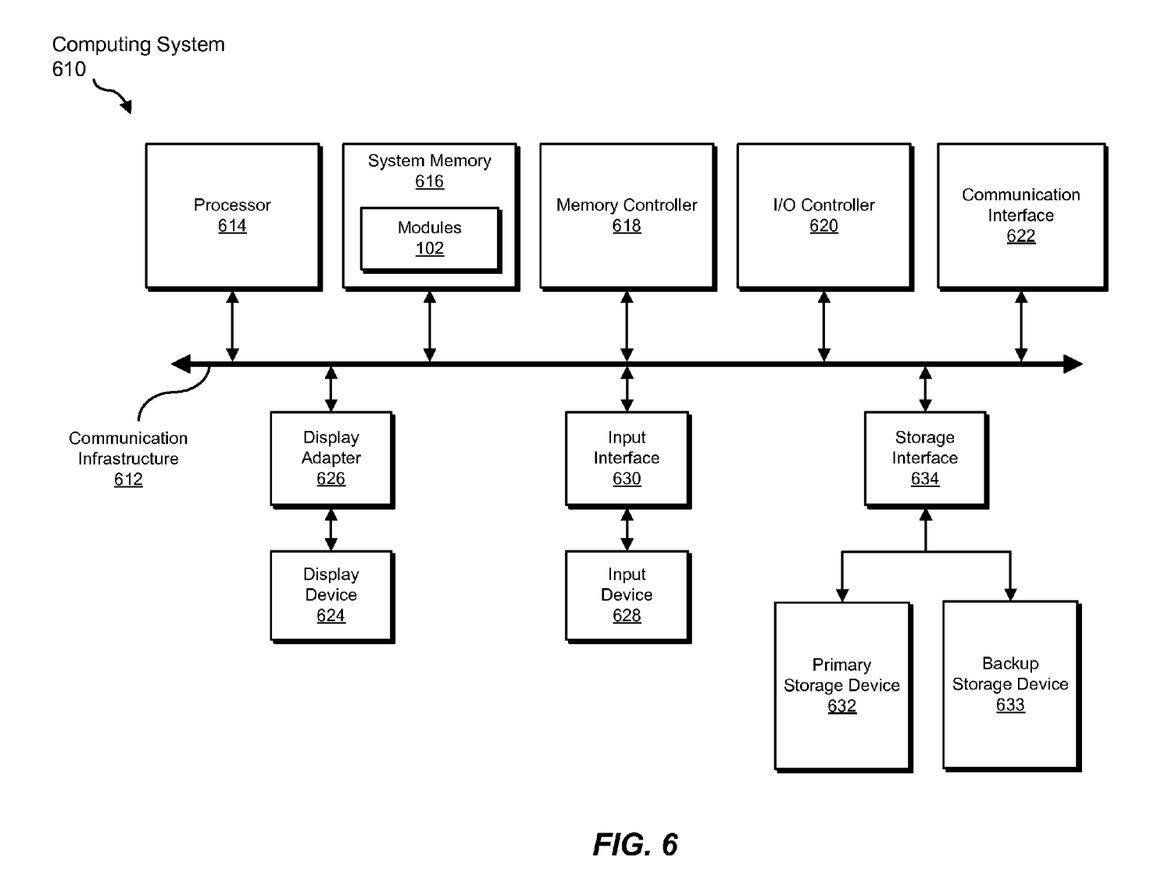
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 410 may perform and/or be a means for performing, either alone or in combination with other elements, one or more of the gerund phrases from claims steps described herein. All or a portion of computing system 410 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
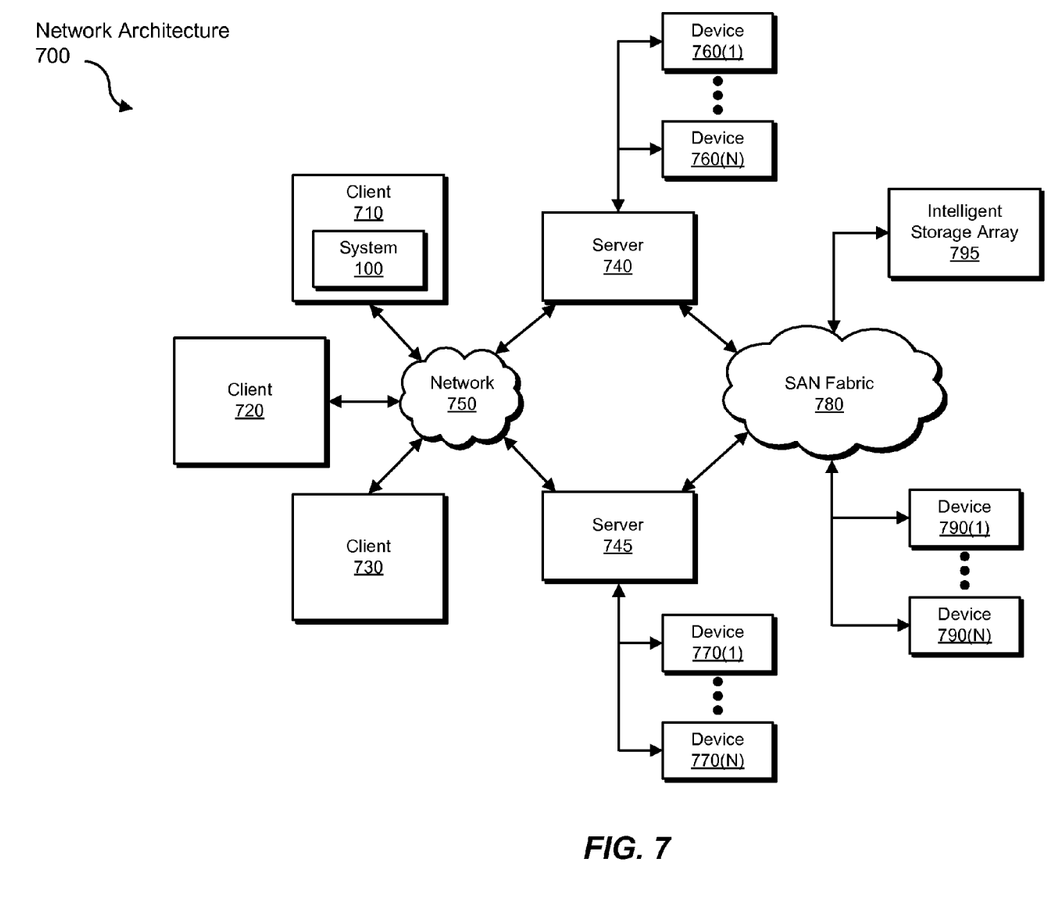
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the gerund phrases from claims steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting cloud-based data leaks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system capable of detecting cloud-based data leaks.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting cloud-based data leaks, at least a portion of the method being performed by a computing device comprising at least one processor, the method comprising:

identifying a relational database stored on a third-party storage service, wherein the relational database:
comprises a plurality of tuples related by an attribute designated for storing contact information;
is accessible, via the third-party storage service, to at least:
an owner of the relational database;
at least one authorized party who is authorized by the owner of the relational database to access at least a portion of the relational database via the third-party storage service;
adding at least one deceptive tuple representing an illegitimate contact and comprising known false contact information stored under the attribute to the relational database;
maintaining a data repository identifying the deceptive tuple as containing false contact information;
identifying a contact attempt performed by an attempted use of the known false contact information;
in response to identifying the contact attempt:
determining, based on the data repository identifying the deceptive tuple as containing false contact information, whether the authorized party had access to the deceptive tuple;
determining that the authorized party is not implicated in a cloud-based data leak if the authorized party did not have access to the deceptive tuple;
determining that the authorized party is implicated in a cloud-based data leak if the authorized party had access to the deceptive tuple.

2. The computer-implemented method of claim 1, wherein an access requirement of the owner for accessing the relational database is different than an access requirement of the authorized party for accessing the relational database.

3. The computer-implemented method of claim 1, wherein adding the at least one deceptive tuple comprises:
identifying a first subset of data within the relational database with a first access requirement for accessing data within the first subset;
identifying a second subset of data within the relational database with a second access requirement for accessing data within the second subset, wherein:
the second subset of data is distinct from the first subset of data;
the second access requirement is distinct from the first access requirement;
the authorized party is capable of accessing the second subset of data;
adding a first deceptive tuple to the first subset;
adding a second deceptive tuple to the second subset based at least in part on the second access requirement being distinct from the first access requirement.

4. The computer-implemented method of claim 3, wherein adding the second deceptive tuple to the second subset based at least in part on the second access requirement being distinct comprises:
identifying a plurality of authorized parties with access to at least the portion of the relational database;
determining that a subset of the plurality of authorized parties that comprises the authorized party meets the second access requirement but not the first access requirement.

5. The computer-implemented method of claim 3, wherein:
the first deceptive tuple and the second deceptive tuple comprise different false contact information;
determining that the authorized party is implicated in the cloud-based data leak comprises determining that an originator of the contact attempt met the second access requirement based on the difference between the first deceptive tuple and the second deceptive tuple and based on adding the first deceptive tuple to the first subset and the second deceptive tuple to the second subset.

6. The computer-implemented method of claim 1, wherein maintaining the data repository identifying the deceptive tuple as containing false contact information comprises maintaining an age of the deceptive tuple, and the method further comprises:
removing the deceptive tuple based on the age of the deceptive tuple exceeding a predetermined threshold;
adding a new deceptive tuple to the relational database to replace the deceptive tuple based on the removal of the deceptive tuple.

7. The computer-implemented method of claim 1, wherein the authorized party comprises an operator of the third-party storage service.

8. The computer-implemented method of claim 1, wherein determining that the authorized party is implicated in the cloud-based data leak comprises:
identifying a data access log comprising access records for data within the relational database;
identifying a record of access of the known false contact information within the data access log;
determining, based on analyzing the data access log, that the record of access of the known false contact information implicates the authorized party in the cloud-based data leak.

9. A system for detecting cloud-based data leaks, the system comprising:
an identification module programmed to identify a relational database stored on a third-party storage service, wherein the relational database:
comprises a plurality of tuples related by an attribute designated for storing contact information;
is accessible, via the third-party storage service, to at least:
an owner of the relational database;
at least one authorized party who is authorized by the owner of the relational database to access at least a portion of the relational database via the third-party storage service;
an injection module programmed to:
add at least one deceptive tuple representing an illegitimate contact and comprising known false contact information stored under the attribute to the relational database;
maintain a data repository identifying the deceptive tuple as containing false contact information;
a detection module programmed to identify a contact attempt performed by an attempted use of the known false contact information;
a determination module programmed to, in response to identifying the contact attempt,
determine, based on the data repository identifying the deceptive tuple as containing false contact information, whether the authorized party had access to the deceptive tuple;
determine that the authorized party is not implicated in a cloud-based data leak if the authorized party did not have access to the deceptive tuple;
determine that the authorized party is implicated in a cloud-based data leak if the authorized party had access to the deceptive tuple;
at least one processor configured to execute the identification module, the injection module, the detection module, and the determination module.

10. The system of claim 9, wherein an access requirement of the owner for accessing the relational database is different than an access requirement of the authorized party for accessing the relational database.

11. The system of claim 9, wherein the injection module is programmed to add the at least one deceptive tuple by:
   identifying a first subset of data within the relational database with a first access requirement for accessing data within the first subset;
   identifying a second subset of data within the relational database with a second access requirement for accessing data within the second subset, wherein:
      the second subset of data is distinct from the first subset of data;
      the second access requirement is distinct from the first access requirement;
      the authorized party is capable of accessing the second subset of data;
   adding a first deceptive tuple to the first subset;
   adding a second deceptive tuple to the second subset based at least in part on the second access requirement being distinct from the first access requirement.

12. The system of claim 11, wherein the injection module is programmed to add the second deceptive tuple to the second subset based at least in part on the second access requirement being distinct by:
   identifying a plurality of authorized parties with access to at least the portion of the relational database;
   determining that a subset of the plurality of authorized parties that includes the authorized party meets the second access requirement but not the first access requirement.

13. The system of claim 11, wherein:
   the first deceptive tuple and the second deceptive tuple comprise different false contact information;
   the determination module is further programmed to determine that the authorized party is implicated in the cloud-based data leak by determining that an originator of the contact attempt met the second access requirement based on the difference between the first deceptive tuple and the second deceptive tuple and based on adding the first deceptive tuple to the first subset and the second deceptive tuple to the second subset.

14. The system of claim 9, wherein:
   the injection module is programmed to maintain the data repository identifying the deceptive tuple as containing false contact information by maintaining an age of the deceptive tuple;
   the injection module is further programmed to:
      remove the deceptive tuple based on the age of the deceptive tuple exceeding a predetermined threshold;
      add a new deceptive tuple to the relational database to replace the deceptive tuple based on the removal of the deceptive tuple.

15. The system of claim 9, wherein the detection module is programmed to identify the contact attempt performed by an attempted use of the known false contact information by receiving a report from a honeypot system configured to receive contact attempts directed to the known false contact information.

16. A non-transitory computer-readable-storage medium comprising one or more computer-executable instructions that, when executed by at least one processor of a computing device, cause the computing device to:
   identify a relational database stored on a third-party storage service, wherein the relational database:
   comprises a plurality of tuples related by an attribute designated for storing contact information;
   is accessible, via the third-party storage service, to at least:
   an owner of the relational database;
   at least one authorized party who is authorized by the owner of the relational database to access at least a portion of the relational database via the third-party storage service;
   add at least one deceptive tuple representing an illegitimate contact and comprising known false contact information stored under the attribute to the relational database;
   maintain a data repository identifying the deceptive tuple as containing false contact information;
   identify a contact attempt performed by an attempted use of the known false contact information;
   in response to identifying the contact attempt:
   determine, based on the data repository identifying the deceptive tuple as containing false contact information, whether the authorized party had access to the deceptive tuple;
   determine that the authorized party is not implicated in a cloud-based data leak if the authorized party did not have access to the deceptive tuple;
   determine that the authorized party is implicated in a cloud-based data leak if the authorized party had access to the deceptive tuple.

* * * * *